2,929,200

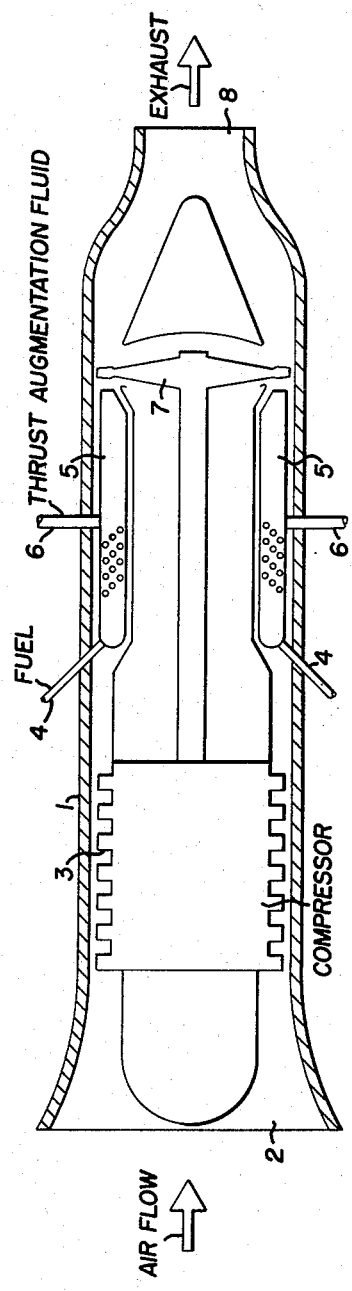

PROCESS FOR AUGMENTING THRUST OF JET ENGINES

Theodore B. Wasserbach, Cranford, and John J. Kolfenbach, North Plainfield, N.J., assignors to Esso Research and Engineering Company, a corporation of Delaware Application September 26, 1956, Serial No. 612,311

5 Claims. (Cl. 60—35.4)

The present invention as concerned with an improved process for increasing the thrust of an aviation jet engine and particularly of a turbo-jet engine, which is operated by taking air from the atmosphere, heating it by combustion of fuel and passing it through the engine at high temperature. In particular the present invention deals with a new method for increasing the thrust of aviation jet engines by injecting concentrated and wholly aqueous solutions of certain nitrogen compounds into the hot gases produced within the engine by the combustion of fuel in air, so as to hold the temperature within the engine below a critical maximum, while at the same time generating additional gas by the steady combustion of the nitrogen compounds and by evaporation of the water of solution. More particularly the improved method is concerned with producing a much larger volume and/or mass of gas than would be produced by the vaporization of water if used alone in a liquid volume equal to that of the aqueous solution of nitrogen compound, so that the net volume of gas produced over and above the volume of air required for burning the nitrogen compound is at least 3.25 moles per mole of nitrogen compound in the liquid phase, and without any net increase in temperature of the gases. In a particularly advantageous application of the present invention the concentration of the nitrogen compound is so chosen that the net volume of gas is produced without either heating or cooling the total mass.

As is well known, the thrust of a jet engine depends on the momentum of the gases when ejected. The momentum depends on the number of moles of gas, the weight of gas and its velocity. The velocity can be increased by raising the temperature and/or by increasing the number of moles of gas formed in the combustion of the fuel in air. The increase of temperature is limited in practice by the strength of the metals used in the engine. For practical purposes, the temperature cannot exceed 1900° F. and generally is not allowed to exceed 1500° F. It is therefore important to be able to increase the thrust of an engine by increasing the number of moles of gas formed by combustion without exceeding the limiting temperature.

As pointed out above, the thrust produced by a jet engine equals the mass flow through the exhaust duct times its increase in speed. By producing larger volumes of gas without raising the temperature in the combustion zone by means of this invention, a substantially greater gas mass is caused to flow through the exhaust duct, thus enlarging the factor by which the increase in speed is multiplied. It will thus be seen that a much greater thrust can be produced by a jet engine utilizing this invention.

The thrust augmentation fluid to be used in accordance with the present invention has the characteristics of liberating only small quantities of heat when it forms gases and, at the same time, of absorbing very little heat when it becomes gasified so as not to lower excessively the temperature of the heated air and products of combustion which provide thrust for the engine. The liquid has a high density so that a large weight of it can be stored in a small volume as an auxiliary liquid in a tank of small capacity relative to the tanks of fuel in an aircraft. The liquid is ashless. It is non-explosive so as to be safe to use and yet it has the property of generating large quantities of gases.

The method of carrying out the invention will be evident from an inspection of the drawing in which the single figure shows a diagrammatic sketch of a turbo-jet engine. The invention is applicable to the operation of pulse jet engines and ram jet engines as well, although the feature of temperature control is particularly critical in turbines of turbo-jet engines.

The turbo-jet engine comprises an elongated shell 1, open at both ends so as to permit high velocity gases to flow therethrough. Air enters through the up-stream opening 2 and is compressed by compressor 3, which is operatively connected to and driven by turbine 7. The compressed air flows into the combustion chambers 5 wherein it is mixed with fuel introduced by means of lines 4. The solution employed as a thrust augmentation fluid is introduced into the hot combustion gases by means of lines 6. The hot gases then flow through turbine 7 and are jetted through tail-pipe 8 as shown, the thrust thereby developed being used for the desired power.

Care must be taken to maintain the jet engine at operational efficiency. When too much of the aqueous solution of nitrogen compound is injected into the combustion zone of the jet engine, a back pressure is produced which tends to cut down on the operational efficiency of the engine. There would also be the danger of quenching the flame by introducing too large a proportion of aqueous solution at one time and also the disadvantage of having to carry too large a load of auxiliary liquid in proportion to the load of fuel. Therefore the proportion of thrust augmentation fluid used is between 0.1 part and 3 parts by weight per part of hydrocarbon fuel. The preferred proportions are between 0.5 part and 2 parts of liquid per part of fuel by weight, and these proportions are used at intervals as needed for brief spurts of thrust. When the thrust augmentation liquid enters the hot combustion gases, the water in the solution evaporates and the nitrogen compound decomposes or burns to form at least 3.25 net moles of gases per mole of nitrogen compound.

The improved method of this invention is applied to aviation jet engines operating under such conditions that 1 pound of fuel heats a total of at least 20 pounds of air and at most 400 pounds of air taken from the ambient atmosphere to a temperature of at least 1500° F. In terms of overall fuel-air ratio the foregoing proportions are 0.05 to 0.0025. As one purpose of the invention is to control the maximum temperature of operation, and because the temperatures will be highest near the stoichiometric mixtures of fuel and air, the invention is particularly useful in the ranges below an air-fuel ratio of 200 and is preferably used between air-fuel ratios of 150 and 50, which correspond to overall fuel-air ratios of 0.0066 and 0.02 respectively, and which include both the so-called primary admission of air for burning the fuel and the secondary air which is admitted to be heated by the products of combustion and so to provide thrust by expansion.

It is to be understood that thrust augmentation is important when the aviation jet engine is being operated with the maximum rate of flow of fuel compatible with the maximum temperature limited by the heat resistance of the metal parts. The present invention, therefore, is particularly applicable under conditions of take-off of air craft and more particularly for take-off when the atmospheric temperature is high. At high atmospheric temperature, the intake of air into the engine is less by weight than when the weather is cool. For example, a turbo-jet engine developing a static thrust of 3600 pounds when the outside air temperature is 60° F. will develop only 3000 pounds of thrust in a tropical atmosphere of 105° F. If more fuel were burned per unit of time under these conditions, that is if the fuel-air ratio were increased, the temperature of combustion would increase beyond the permissible limit of 1500° F. In these circumstances, therefore, the injection of the thrust augmentation liquid of the present invention is particularly effective.

For use in accordance with this invention, the liquid to be injected for thrust augmentation is an aqueous solution consisting essentially of 80 to 60% water and of not less than about 20%, nor more than about 40% by weight of a non-explosive ashless nitrogen compound which upon decomposition by heat or combustion develops at least 3.25 net moles of gases over and above the moles of oxygen required for combustion of one mole of the nitrogen compound. The thermodynamic properties of the nitrogen compounds to be used in solution in the aforementioned liquid must be such as to ensure that the compounds, and more particularly their solutions, are not spontaneously explosive and that while the compounds generate some heat, their solutions do not have an excessive tendency either to heat, or to cool, the air and the products of combustion of the fuel, which together with the vapor from the water and the net gases evolved by the compounds constitute the working fluid of the aviation jet engine. The heat of formation of the nitrogen compound, that is, the difference between the heat of formation of its products of decomposition and its heat of combustion must be large, being at least 150 kilocalories per mole. The preferred water-soluble nitrogen compounds fulfilling the foregoing requirements have molecular weights between 70 and 140 and are ammonium salts of acids containing carbon in their molecular structure, examples of suitable ammonium salts being ammonium acetate, ammonium carbamate and ammonium carbonate, the last named compound being preferred. Especially preferred for use in accordance with this invention are saturated aqueous solutions of ammonium carbonate.

Ammonium sulfate may also be employed in practicing this invention. This salt fulfills the requirements of ashlessness, water-solubility, high heat of formation and large net evolution of gas; but it does not contain carbon in its molecule. Also it liberates upon combustion the acid gas $SO_3$ which is corrosive to metal. Ammonium sulfate therefore is not so generally useful for the purpose of this invention as the preferred salts.

The following equations show the manner in which ammonium acetate, ammonium carbamate, ammonium sulfate, and ammonium carbonate evolve gases in contrast to two compounds of the prior art.

Ammonium acetate:

$$4CH_3COONH_4 + 11O_2 \rightarrow 2N_2 + 14H_2O + 8CO_2$$

4 moles ammonium acetate produce (24 minus 11) or 13 moles of gas net.
    1 mole ammonium acetate produces 3.25 net moles of gas at standard conditions.

Ammonium carbamate:

$$NH_2COONH_4 + 1.5O_2 \rightarrow N_2 + 3H_2O + CO_2$$

1 mole ammonium carbamate produces (5 minus 1.5) or 3.5 net moles of gas at standard conditions.

Ammonium sulfate:

$$(NH_4)_2SO_4 + 1.5O_2 \rightarrow N_2 + 4H_2O + SO_3$$

1 mole ammonium sulfate produces (6 minus 1.5) or 4.5 net moles of gas at standard conditions.

Ammonium carbonate:

$$2(NH_4)_2CO_3 + 3O_2 \rightarrow 2N_2 + 8H_2O + 2CO_2$$

2 moles of ammonium carbonate produce (12 minus 3) or 9 net moles of gas.
    1 mole ammonium carbonate produces 4.5 net moles of gas at standard conditions. One pound mole therefore produces the large additional net volume of over 1600 cubic feet of gas.

Urea:

$$(NH_2)_2CO + 1.5O_2 \rightarrow N_2 + 2H_2O + CO_2$$

1 mole urea produces (4 minus 1.5) or only 2.5 net moles of gas.

Ammonium nitrate:

$$2NH_4NO_3 \rightarrow 2N_2 + 4H_2O + O_2$$

Ammonium nitrate decomposes explosively and produces oxygen which supports further combustion.

$$2N_2 + O_2 \rightarrow 2N_2O$$

The net result of the last two foregoing equations is as follows:

$$2NH_4NO_3 \rightarrow 4H_2O + 2N_2O$$

2 moles ammonium nitrate produce 6 moles of gas.
    1 mole ammonium nitrate produces 3.0 moles of gas.

It will be noted that urea and ammonium nitrate produce significantly fewer net moles of gas per mole of nitrogen compound than do the compounds suitable for use in accordance with the present invention, namely ammonium acetate, ammonium carbamate, ammonium sulfate and ammonium carbonate. In addition, the heats of formation of the first-named two compounds are quite low, being 87 kilo calories for ammonium nitrate and 100 kilocalories for urea per mole. In contrast the heats of formation for ammonium acetate, ammonium carbamate, ammonium sulfate and ammonium carbonate are respectively 150, 170, 167 and 223 kilo calories per mole.

As mentioned above it is known in the prior art to use water as a liquid for thrust augmentation. Of course, water is non-combustible and produces only one mole of net gas per mole of liquid injected. Aqueous solutions of alcohol have also been used in the prior art. For example:

Ethyl alcohol:

$$C_2H_5OH + 3O_2 \rightarrow 3H_2O + 2CO_2$$

1 mole of ethyl alcohol produces (5 minus 3) or only 2 moles of gas net.

Furthermore, alcohol has a heating value of 327.6 kilo calories per gram or 12,800 B.t.u. per pound. As a result, its heat of formation is only 66 kilo calories per mole.

For purpose of reference, the results of the foregoing calculations are summarized in Table I:

TABLE I

|  | Per Mole of Compound | | | |
| --- | --- | --- | --- | --- |
|  | K Cal Heat of Formation | Moles of Oxygen for Combustion | Moles of Gas Formed by Combustion | Net Moles of Gas |
| Compounds of Present Invention: | | | | |
|   Ammonium Carbonate | 223 | 1.50 | 6.00 | 4.50 |
|   Ammonium Sulfate | 167 | 1.50 | 6.00 | 4.50 |
|   Ammonium Carbamate | 170 | 1.50 | 5.00 | 3.50 |
|   Ammonium Acetate | 150 | 2.75 | 6.00 | 3.25 |
| Prior Art Compounds: | | | | |
|   Urea | 100 | 1.50 | 4.00 | 2.50 |
|   Ammonium Nitrate | 87 | 0 | 3.00 | 3.00 |
|   Ethyl Alcohol | 66 | 3.00 | 5.00 | 2.00 |
|   Water | 34 | 0 | 1.00 | 1.00 |

Table I clearly shows that the preferred nitrogen compounds for use in accordance with the present invention have in high degree the properties required for augmenting thrust without causing excessive heat evolution. One mole of any of these compounds, occupying less than 2 cu. ft., evolves at least 1160 and up to 1615 cu. ft., net, of gas measured at standard conditions. Furthermore, each mole, while consuming at least 1.5 moles of oxygen by combustion so as to produce some heat, has absorbed a heat of formation of its own at least 50% and as much as 150% higher than that of a mole of the compounds of the prior art and thereby has little net production of heat. The combination of high net evolution of gas and low net production of heat is the merit of the preferred nitrogen compounds for use in accordance with this invention, which is a means for increasing thrust by evolving more moles of gas without producing excessive heat.

In addition to the advantages in gas produced, the thrust augmenting aqueous solutions of this invention have greater densities than either water or the aqueous alcohol blends used in the prior art. The value of high density, as mentioned above, is especially advantageous in high speed jet propelled aircraft because a dense liquid occupies less space and the limitation of the quantity of liquid that can be carried on these aircraft is one of volume rather than of weight.

The following examples are illustrative of the invention.

*Example 1*

A 21.2 percent aqueous solution of ammonium carbonate is injected into the combustion chamber of a jet engine ahead of the turbine. The advantage of using the solution rather than water as in the prior art is shown by the following calculations: The salt solution has a density of 1.15, and consists of 21.2 wt. percent salt having a molecular weight of 96 and 78.8 wt. percent water having a molecular weight of 18. One liter of salt solution therefore weighs 1150 g. and consist of 244 g. (2.54 moles) of salt and 906 g. (50.3 moles) of water. since each mole of salt on combustion produces a net increase of 4.5 moles of gas, the net increase from the 2.54 moles of salt in the solution is 11.4 moles. Adding this quantity to the gas produced by the water in the solution (50.3 moles) gives a total of 61.7 moles of gas produced from the salt solution.

On the other hand, one liter of water contains only 55.5 moles. The advantage in gas volume obtained by using the salt solution of the invention rather than water is therefore 61.7 minus 55.5, or 6.2 moles, which equals 11.2%. The advantage in mass is 15%, since the densities of the solution and of water are 1.15 and 1.0, respectively. For practical purposes in this environment gas volume and gas velocity can be treated as equivalents. Therefore, the overall advantage can be calculated on the basis of momentum, i.e., the product of mass and velocity, the mass of the solution being 1.15 times that of water and the volume of gas produced from the solution being 1.112 times that given by water.

$$\frac{\text{Thrust from solution}}{\text{Thrust from water}} = \frac{(1.15)m(1.112)v}{mv} = 1.28$$

The overall advantage of using the solution as a thrust augmentation fluid rather than water as in the prior art is therefore 28 percent.

The effect of the water in compensating for the heat evolved upon combustion of the ammonium carbonate is shown by the following calculations:

Heat of combustion of ammonium carbonate=100 kg. cal./gram mole.
Heat of evaporation of water=0.5 kg. cal./gram.
Heat required to raise water temperature from 100° C. to 800° C.=0.35 kg. cal./gram.

In one pound of a 21.2 percent aqueous solution of ammonium carbonate there are 95 grams (about 1 gram mole) of ammonium carbonate and 359 grams of water. Therefore 1 pound of the solution releases about 100 kg. calories from combustion of the ammonium carbonate but absorbs 180 kg. calories from vaporization of the water plus 125 kg. calories in raising the water vapor temperature to 800° C., making a net change of 205 kg. calories of heat absorbed.

As one pound of jet fuel releases about 3700 kg. calories upon combustion, at a ratio of 0.1 pound of thrust augmentation fluid per pound of fuel, there would be only a minor effect on the temperature, i.e., $$\frac{0.1 \times 205}{3700} \times 100 \text{ or about } 0.6\% \text{ temperature lowering}$$

At an augmentation-fluid-to-fuel ratio of 3 pounds per pound of fuel, the effect would be $$\frac{3 \times 205}{3700} \times 100 \text{ or about } 16.3\% \text{ temperature lowering}$$

Within the preferred range of from 0.5 to 2.0 pounds of augmentation fluid per pound of principal fuel there would be a temperature lowering effect of from about 2.8% to about 11.1%.

*Example 2*

A 30 percent solution of ammonium acetate in water is employed for thrust augmentation as described in Example 1. In this case the net increase in moles of gas per mole of ammonium acetate is 3.25 moles. One mole of the salt weighs 77 grams and the 30 percent solution has a density of 1.06. Applying the same type of calculations as in Example 1, the overall advantage of using the ammonium acetate solution rather than water is about 6 percent.

Employing the same method of calculation as in Example 1, and knowing that the heat of combustion of ammonium acetate is 240 kg. calories per gram mole, the following is evident:

In one pound of a 30 percent aqueous solution of ammonium acetate there are about 136 grams (1.76 moles) of ammonium acetate and about 318 grams of water. Therefore, one pound of the solution releases about 420 kg. calories from combustion of the ammonium acetate but absorbs 159 kg. calories from vaporization of the water plus 111 kg. calories to raise the temperature of the water vapor to 800° C., making a net change of 150 kg. calories of heat released. Thus, calculating the effect on temperature in the same manner as in Example 1, within the preferred limits of from 0.5 to 2.0 pounds of augmentation fluid per pound of main fuel there would be a temperature rise of from about 2% to about 8%.

*Example 3*

The heat of combustion of ammonium carbamate is 98 kg. calories per gram mole. In one pound of a solution of 40 parts of ammonium carbamate in 100 parts of water there are 130 grams (1.67 moles) of ammonium carbamate and 324 grams of water. Therefore, one pound of the solution releases about 164 kg. calories from combustion of the ammonium acetate but absorbs 162 kg. calories from vaporization of the water plus 110 kg. calories in raising the water vapor temperature to 800° C., making a net change of 100 kg. calories of heat absorbed. Thus within the limits of from 0.1 to 3 pounds of augmentation fluid per pound of main fuel there would be a temperature lowering of from about 0.3% to about 8%. Within the preferred limits of from 0.5 to 2 pounds of augmentation fluid per pound of fuel the maximum temperature lowering would be about 5.4%.

*Example 4*

A 40 percent solution of ammonium sulfate is employed for thrust augmentation as described in Example 1. One pound of a 40 percent solution of ammonium sulfate contains 182 grams (1.38 moles) of ammonium sulfate and 272 grams of water. The heat of combustion of ammonium sulfate is 56 kg. calories per gram mole. Therefore, one pound of the thrust augmentation fluid releases 77 kg. calories from the combustion of the ammonium sulfate but absorbs 136 kg. calories from vaporization of the water plus 95 kg. calories in raising the water vapor temperature to 800° C. Thus there is a net heat absorption of 154 kg. calories, effecting a temperature lowering of from about 2 percent to about 8 percent within the preferred limits of 0.5 to 2 pounds of thrust augmentation fluid per pound of fuel.

It will be seen from the above examples that the thrust augmentation fluids of this invention produce relatively small changes in temperature, particularly when employed within the preferred limits of from 0.5 to 2 pounds of fluid per pound of fuel. If it is desired to reduce the temperature change to substantially zero it has been found, that for heats of combustion between 45 and 245 kg. calories per gram mole, the equation: $\log y = 2.3617 - 0.3889x$, may be applied, wherein $y$ is the value for the heat of combustion of the particular nitrogen compound employed, in kg. calories, and $x$ is the ratio of concentration, in parts by weight per 100 parts of water, to the molecular weight of the particular nitrogen compound employed. Applying that equation to ammonium acetate, for example, it will be found that a solution of 23 parts of that compound in 100 parts of water, i.e., a solution of approximately 20 percent concentration, will essentially neither absorb nor release heat when used as a thrust augmentation liquid.

In accordance with the present invention, the preferred thrust augmentation liquid is an essentially saturated aqueous solution of ammonium carbonate to be used in proportions between 0.1 pound and 3 pounds per pound, and preferably in proportions between 0.5 pound and 2 pounds per pound, of fuel being consumed. When the liquid is used in each of the wider limiting proportions and the overall air-fuel ratio is at stated values of 10 and 200, then the ratio of gas, produced from the ammonium carbonate, to the other gases is as shown in the following tabulation:

| Solution/Fuel Ratio | Air/Fuel Ratio | Ratio of Gas from Ammonium Carbonate to Other Gases |
|---|---|---|
| 0.1/1 | 10/1 | 1/282 |
| 0.1/1 | 200/1 | 1/5100 |
| 3/1 | 10/1 | 1/12.3 |
| 3/1 | 200/1 | 1/17.3 |

It is to be noted particularly that the ratios in the third column above are all less than 1/10. Of course, the air-fuel ratio of 10/1 is shown only as an extreme limit; because in practice such rich mixtures of hydrocarbon fuel are not fully combustible. The present invention is not intended to be used when the overall air/fuel ratio is richer than 20/1 and is preferably used when this ratio is between 50/1 and 150/1.

In brief summary the present invention is an improvement in the method of operating a jet engine for aircraft propulsion by taking in air from the atmosphere in the front of the engine, heating the air by burning a liquid fuel with a portion of the oxygen in the air, having an overall air-fuel ratio between 20 and 400 by weight, and ejecting the heated gases at high velocity from the rear of the engine to provide thrust. The improvement in the method is to increase the thrust while controlling the temperature of the gases by injecting, as thrust augmentation liquid into the gases at a temperature between 1500° F. and 1900° F. in a proportion between 0.1 pound and 3 pounds per pound of fuel, an aqueous solution consisting essentially of 80% to 60% water and of 20% to 40% by weight of an ashless, non-explosive nitrogen compound having a heat of formation of at least 150 kilo calories per mole and being such that upon thermal decomposition in the presence of air the compound gives a net production of at least 3.25 moles of gas per mole of itself, or alternatively that 1 pound of its aqueous solution gives a net production of at least 18 cubic feet of gas measured at standard conditions of temperature and pressure.

This invention is not to be limited to the specific examples presented, which have been given for the purpose of illustrating the invention. The scope of the invention is limited only by the following claims.

What is claimed is:

1. An improved process for augmenting the thrust developed by a jet engine that operates by taking in air, heating the air by burning a fuel with a portion of the oxygen from the air, using an overall air-fuel ratio within the range of 20/1 to 400/1, and ejecting the resultant heated gases at high velocity from the rear of the engine, which comprises injecting into the heated gases within the engine, in the proportion of from 0.1 to 3 pounds per pound of fuel, an aqueous solution consisting essentially of from about 80% to 60% of water by weight and of from about 20% to about 40% by weight of an ammonium compound selected from the group consisting of ammonium carbonate, ammonium acetate, ammonium carbamate, and ammonium sulfate.

2. Process as defined by claim 1 wherein said ammonium compound is ammonium carbonate.

3. Process as defined by claim 1 wherein said ammonium compound is ammonium acetate.

4. Process as defined by claim 1 wherein said ammonium compound is ammonium carbamate.

5. Process as defined by claim 1 wherein said ammonium compound is ammonium sulfate.

References Cited in the file of this patent

UNITED STATES PATENTS

| 1,512,354 | Maxim | Oct. 21, 1924 |
| 2,657,977 | Stengel et al. | Nov. 3, 1953 |

FOREIGN PATENTS

| 133,508 | Australia | July 14, 1949 |